(12) United States Patent   (10) Patent No.: US 7,887,602 B2
Christnacher et al.   (45) Date of Patent: *Feb. 15, 2011

(54) REACTIVE DYES, THEIR PREPARATION AND THEIR USE

(75) Inventors: Hubert Jean Luc Christnacher, Dietwiller (FR); Athanassios Tzikas, Pratteln (CH); Georg Roentgen, Freiburg (DE)

(73) Assignee: Huntsman International, LLC, The Woodlands, TX (US)

( * ) Notice: Subject to any disclaimer, the term of this patent is extended or adjusted under 35 U.S.C. 154(b) by 550 days.

This patent is subject to a terminal disclaimer.

(21) Appl. No.: 12/063,277

(22) PCT Filed: Aug. 2, 2006

(86) PCT No.: PCT/EP2006/064937

§ 371 (c)(1),
(2), (4) Date: Feb. 8, 2008

(87) PCT Pub. No.: WO2007/017425

PCT Pub. Date: Feb. 15, 2007

(65) Prior Publication Data

US 2010/0154145 A1   Jun. 24, 2010

(30) Foreign Application Priority Data

Aug. 9, 2005 (EP) .................................. 05107317

(51) Int. Cl.
*C09B 45/28* (2006.01)
(52) U.S. Cl. ...................... 8/685; 8/543; 8/549; 8/641; 8/918; 534/617; 534/619; 534/620; 534/622; 534/623; 534/624; 534/625
(58) Field of Classification Search ..................... 8/549, 8/543, 641, 685, 918; 534/617, 619, 620, 534/622, 623, 624, 625
See application file for complete search history.

(56) References Cited

U.S. PATENT DOCUMENTS

| 4,772,687 | A | 9/1988 | Henk et al. | |
| 6,623,533 | B2 | 9/2003 | Tzikas et al. | |
| 6,852,135 | B2 * | 2/2005 | Steckelberg et al. | 8/549 |
| 7,604,669 | B2 * | 10/2009 | Sire et al. | 8/549 |

FOREIGN PATENT DOCUMENTS

| EP | 458743 | 11/1991 |
| WO | WO 02/04741 | 1/2002 |
| WO | WO 02/08342 | 1/2002 |

* cited by examiner

*Primary Examiner*—Lorna M Douyon
*Assistant Examiner*—Amina Khan

(57) ABSTRACT

Reactive dyes of formula

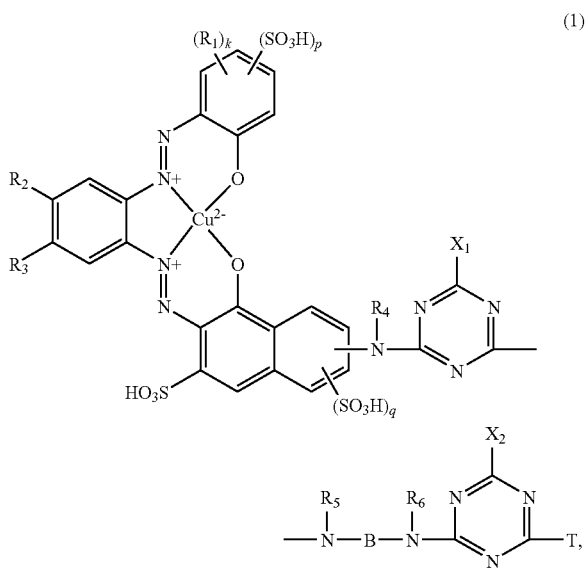

wherein the variables are defined herein.
B is an aliphatic bridging member,
$R_1$ is $C_1$-$C_4$alkyl, halogen or an —$SO_2$—Z radical,
$R_2$ and $R_3$ are each independently of the other $C_1$-$C_4$alkoxy,
$R_4$, $R_5$ and $R_6$ are each independently of the others hydrogen or unsubstituted or substituted $C_1$-$C_4$alkyl,
k and q are each independently of the other the number 0 or 1,
p is the number 0, 1 or 2,
$X_1$ and $X_2$ are each independently of the other halogen, and
T is halogen, a non-fiber-reactive substituent or a fiber-reactive radical of formula

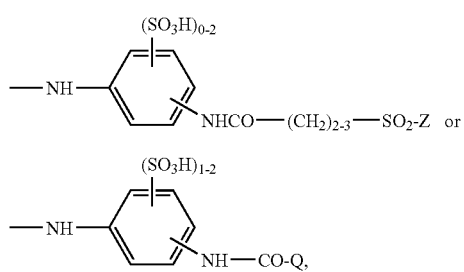

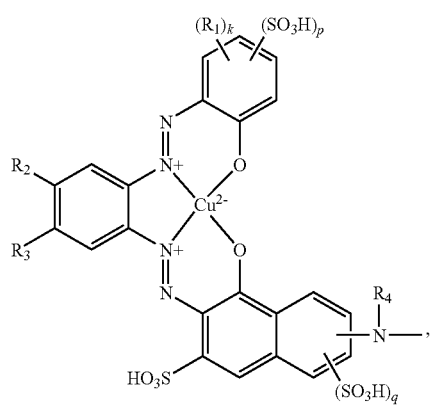

wherein $(R_7)_{0-2}$ denotes from 0 to 2 identical or different substituents from the group halogen, $C_1$-$C_4$alkyl, $C_1$-$C_4$alkoxy and sulfo, Z is vinyl or a —$CH_2$—$CH_2$—U radical and U is a group that is removable under alkaline conditions, Q is a —CH(Hal)-$CH_2$-Hal or —C(Hal)=$CH_2$ group and Hal is halogen, or T is a radical of formula wherein $R_1$, $R_2$, $R_3$, $R_4$, k, p and q each have the definitions given above, are suitable especially for dyeing cotton and yield dyeings having good all-round fastness properties.

14 Claims, No Drawings

REACTIVE DYES, THEIR PREPARATION AND THEIR USE

CROSS REFERENCE TO RELATED APPLICATIONS

This application is the National Phase of International Application PCT/EP2006/064937 filed Aug. 2, 2006 which designated the U.S. and which claims priority to European Patent Application (EP) 05107317.9 filed Aug. 9, 2005. The noted applications are incorporated herein by reference.

The present invention relates to novel reactive dyes, to a process for their preparation and to their use in the dyeing or printing of textile fibre materials.

The practice of dyeing using reactive dyes has recently led to higher demands being made on the quality of the dyeings and the economic efficiency of the dyeing process. As a result, there continues to be a need for novel reactive dyes having improved properties, especially in respect of their application.

Dyeing today requires reactive dyes that have sufficient substantivity and at the same time have good ease of washing-off of unfixed dye. In addition, they should exhibit good colour yield and high reactivity, the objective being especially to provide dyeings having high degrees of fixing. The known dyes do not satisfy those requirements in all properties.

The dyes described in the prior art, such as, for example, the dyes from U.S. Pat. No. 4,772,687 and WO-A-02/08342, still have certain disadvantages in respect of the required properties.

The problem underlying the present invention is accordingly to find, for the dyeing and printing of fibre materials, improved reactive dyes that possess the above-described qualities to a high degree. The novel dyes should be distinguished especially by high fixing yields and high fibre-dye binding stability properties, and in addition it should be possible for dye that is not fixed on the fibres to be washed off easily. The dyes should also yield dyeings having good all-round fastness properties, for example fastness to light and to wetting.

It has been found that the problem posed is largely solved by the novel dyes defined herein-below.

The present invention accordingly relates to reactive dyes of formula wherein

B is an aliphatic bridging member, $R_1$ is $C_1$-$C_4$alkyl, halogen or an —$SO_2$—Z radical, $R_2$ and $R_3$ are each independently of the other $C_1$-$C_4$alkoxy, $R_4$, $R_5$ and $R_6$ are each independently of the others hydrogen or unsubstituted or substituted $C_1$-$C_4$alkyl, k and q are each independently of the other the number 0 or 1, p is the number 0, 1 or 2, $X_1$ and $X_2$ are each independently of the other halogen, and T is halogen, a non-fibre-reactive substituent or a fibre-reactive radical of formula

  (2a)

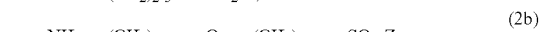  (2b)

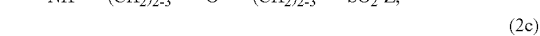  (2c)

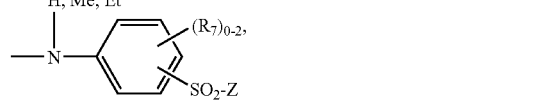  (2d)

  (2e)

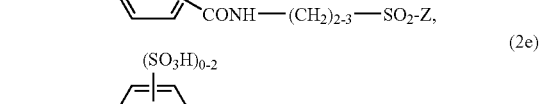  (2f)

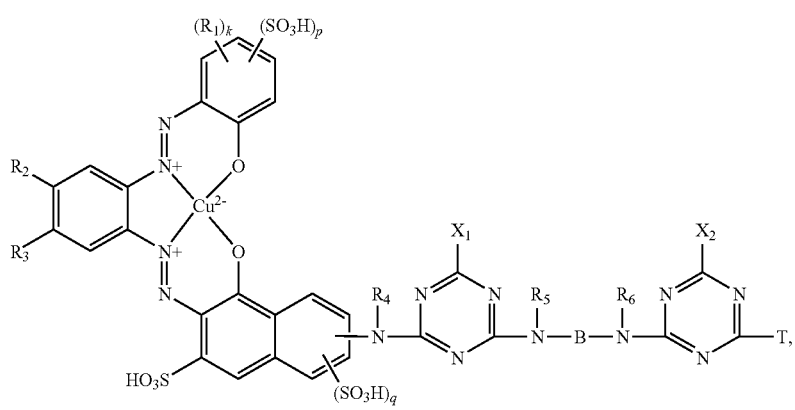  (1)

wherein $(R_7)_{0-2}$ denotes from 0 to 2 identical or different substituents from the group halogen, $C_1$-$C_4$alkyl, $C_1$-$C_4$alkoxy and sulfo, Z is vinyl or a —CH$_2$—CH$_2$—U radical and U is a group that is removable under alkaline conditions, Q is a —CH(Hal)-CH$_2$-Hal or —C(Hal)=CH$_2$ group and Hal is halogen, or T is a radical of formula

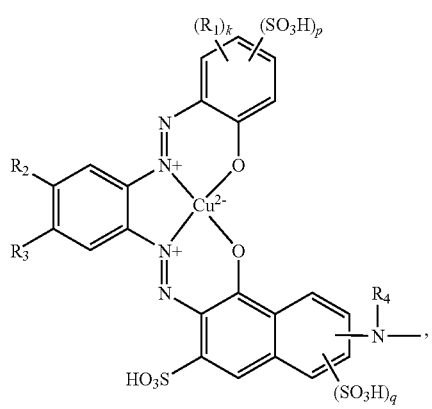
(3)

wherein $R_1$, $R_2$, $R_3$, $R_4$, k, p and q are each as defined above.

In the radical of formula (2c), Me is the methyl radical and Et the ethyl radical. The mentioned radicals, in addition to hydrogen, are possible substituents at the nitrogen atom.

The meaning of the radical $R_1$, $R_2$, $R_3$, $R_4$, k, p or q in formula (1) and the meaning of the corresponding radical $R_1$, $R_2$, $R_3$, $R_4$, k, p or q in the radical T of formula (3) are either identical to or different from one another.

As $C_1$-$C_4$alkyl there come into consideration for $R_1$ and $R_7$, each independently of the other, for example, methyl, ethyl, propyl, isopropyl, n-butyl, sec-butyl, tert-butyl and isobutyl, preferably methyl and ethyl and especially methyl.

The radicals $R_4$, $R_5$ and $R_6$ as alkyl radicals are straight-chain or branched. The alkyl radicals may be further substituted, for example by hydroxy, sulfo, sulfato, cyano or by carboxy. Examples that may be mentioned are methyl, ethyl, n-propyl, isopropyl, n-butyl, sec-butyl, tert-butyl and isobutyl, and also the corresponding radicals substituted by hydroxy, sulfo, sulfato, cyano or by carboxy. Preferred substituents are hydroxy, sulfo or sulfato, especially hydroxy or sulfato and more especially hydroxy.

As $C_1$-$C_4$alkoxy there come into consideration for $R_2$, $R_3$ and $R_7$, each independently of the others, for example methoxy, ethoxy, n-propoxy, isopropoxy, n-butoxy and isobutoxy, preferably methoxy and ethoxy and especially methoxy.

As halogen there come into consideration for $R_1$ and $R_7$, each independently of the other, for example, fluorine, chlorine and bromine, preferably chlorine.

Preferably, $R_1$ is methyl, chlorine or an —SO$_2$—Z radical, especially an —SO$_2$—Z radical, wherein Z is as defined above.

Preferably, $R_2$ and $R_3$ are methoxy.

Preferably, $R_4$ is hydrogen or $C_1$-$C_4$alkyl, especially hydrogen.

Preferably, $R_5$ and $R_6$ are, each independently of the other, hydrogen or $C_1$-$C_4$alkyl that is unsubstituted or substituted by hydroxy, sulfo, sulfato, cyano or by carboxy. According to an embodiment of interest, one of the radicals $R_5$ and $R_6$ is $C_1$-$C_4$alkyl substituted by hydroxy, sulfo, sulfato, cyano or by carboxy, and the other of the radicals $R_5$ and $R_6$ is hydrogen or $C_1$-$C_4$alkyl, especially hydrogen.

Especially preferably, $R_5$ and $R_6$ are each independently of the other hydrogen or $C_1$-$C_4$alkyl, especially hydrogen.

In an important embodiment of the present invention, $R_4$, $R_5$ and $R_6$ are hydrogen.

Preferably, $(R_7)_{0-2}$ denotes from 0 to 2 identical or different substituents from the group $C_1$-$C_4$alkyl, $C_1$-$C_4$alkoxy and sulfo, especially methyl, methoxy and sulfo.

$R_7$ is especially preferably hydrogen.

B as an aliphatic bridging member is, for example, a straight-chain or branched $C_2$-$C_{12}$-alkylene radical, especially a $C_2$-$C_6$alkylene radical, that may be interrupted by 1, 2 or 3 members from the group —NH—, —N(CH$_3$)— and especially —O— and that is unsubstituted or substituted by hydroxy, sulfo, sulfato, cyano or by carboxy. Preferred as a substituent of the alkylene radicals mentioned for B are hydroxy, sulfo or sulfato, especially hydroxy or sulfato.

As aliphatic bridging members for B there also come into consideration, for example, $C_5$-$C_9$-cycloalkylene radicals, especially cyclohexylene radicals. The mentioned cycloalkylene radicals may be unsubstituted or substituted by $C_1$-$C_4$alkyl, $C_1$-$C_4$alkoxy, $C_2$-$C_4$alkanoylamino, sulfo, halogen or by carboxy, especially by $C_1$-$C_4$alkyl. Aliphatic bridging members that may also be mentioned for B are methylenecyclohexylene, ethylenecyclohexylene and methylenecyclohexylenemethylene radicals that are unsubstituted or substituted in the cyclohexylene ring by $C_1$-$C_4$alkyl, especially methyl.

For the radical of formula

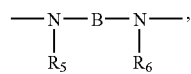

there comes into consideration, for example, also a radical of formula

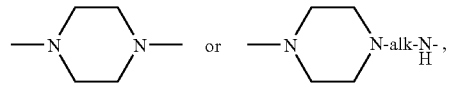

wherein alk is $C_1$-$C_4$alkylene, for example ethylene.

Preferably, B is a $C_2$-$C_{12}$alkylene radical that may be interrupted by 1, 2 or 3 members from the group —NH—, —N(CH$_3$)— and —O— and that is unsubstituted or substituted by hydroxy, sulfo, sulfato, cyano or by carboxy;

a $C_5$-$C_9$cycloalkylene radical unsubstituted or substituted by $C_1$-$C_4$alkyl, $C_1$-$C_4$alkoxy, $C_2$-$C_4$alkanoylamino, sulfo, halogen or by carboxy; or the radical of formula

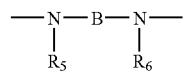

is a radical of formula

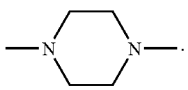

Especially preferably, B is a $C_2$-$C_{12}$alkylene radical that may be interrupted by 1, 2 or 3 —O— members and that is unsubstituted or substituted by hydroxy, sulfo, sulfato, cyano or by carboxy.

Very especially preferably, B is a $C_2$-$C_{12}$alkylene radical, especially a $C_2$-$C_6$alkylene radical, such as, for example, 1,2-ethylene, 1,3-propylene, 1,2-propylene, 1,4-butylene, 1,3-butylene, 1,5-pentylene, 3,5-pentylene, 1,6-hexylene, 2,5-hexylene, 4,6-hexylene or a radical of formula

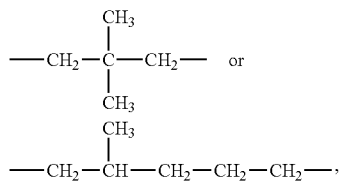

that may be interrupted by 1, 2 or 3 —O— members and that is unsubstituted or substituted by hydroxy or by sulfato, but is preferably unsubstituted and not interrupted by —O—.

Very especially important bridging members B are bridging members of formula —$CH_2$—$CH(R_8)$— wherein $R_8$ is $C_1$-$C_4$alkyl, especially methyl, and, especially, 1,2-propylene.

As halogen there come into consideration for $X_1$, $X_2$ and T, each independently of the others, for example fluorine, chlorine or bromine, preferably fluorine or chlorine.

Especially preferably, $X_2$ is fluorine.

Very especially preferably, $X_1$ and $X_2$ are fluorine.

When T denotes a non-fibre-reactive substituent it may be, for example, hydroxy; $C_1$-$C_4$-alkoxy; $C_1$-$C_4$alkylthio unsubstituted or substituted, for example, by hydroxy, carboxy or by sulfo; amino; amino mono- or di-substituted by $C_1$-$C_8$alkyl, wherein alkyl is unsubstituted or is further substituted, for example, by sulfo, sulfato, hydroxy, carboxy or by phenyl, especially by sulfo or by hydroxy, and may be interrupted one or more times by the radical —O—; cyclohexylamino; morpholino; N—$C_1$-$C_4$alkyl-N-phenylamino or phenylamino or naphthylamino, wherein the phenyl or naphthyl is unsubstituted or substituted, for example, by $C_1$-$C_4$alkyl, $C_1$-$C_4$alkoxy, $C_1$-$C_4$alkanoylamino, carboxy, sulfo or by halogen and the alkyl is unsubstituted or substituted, for example, by hydroxy, sulfo or by sulfato.

Examples of suitable non-fibre-reactive substituents T are amino, methylamino, ethylamino, β-hydroxyethylamino, N-methyl-N-β-hydroxyethylamino, N-ethyl-N-β-hydroxyethylamino, N,N-di-β-hydroxyethylamino, β-sulfoethylamino, cyclohexylamino, morpholino, 2-, 3- or 4-chlorophenylamino, 2-, 3- or 4-methylphenylamino, 2-, 3- or 4-methoxyphenylamino, 2-, 3- or 4-sulfophenylamino, 2,5-disulfophenylamino, 2-, 3- or 4-carboxyphenylamino, 1- or 2-naphthylamino, 1-sulfo-2-naphthylamino, 4,8-disulfo-2-naphthylamino, N-ethyl-N-phenylamino, N-methyl-N-phenylamino, methoxy, ethoxy, n- or iso-propoxy and hydroxy.

As a non-fibre-reactive substituent, T preferably has the definition $C_1$-$C_4$alkoxy; $C_1$-$C_4$alkylthio that is unsubstituted or substituted by hydroxy, carboxy or by sulfo; hydroxy; amino; N-mono- or N,N-di-$C_1$-$C_4$alkylamino that is unsubstituted or substituted in the alkyl moiety/moieties by hydroxy, sulfato or by sulfo; morpholino; phenylamino that is unsubstituted or substituted in the phenyl ring by sulfo, carboxy, acetylamino, chlorine, methyl or by methoxy; or N—$C_1$-$C_4$-alkyl-N-phenylamino that is unsubstituted or substituted in the same way, wherein the alkyl is unsubstituted or substituted by hydroxy, sulfo or by sulfato; or naphthylamino that is unsubstituted or substituted by from 1 to 3 sulfo groups.

Non-fibre-reactive substituents T to which special preference is given are amino, N-methyl-amino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino, 2,5-disulfophenylamino or 4,8-disulfo-2-naphthylamino, especially 2-, 3- or 4-sulfophenylamino, 2,5-disulfophenylamino or 4,8-disulfo-2-naphthylamino.

Hal in the fibre-reactive radical of formula (2f) is preferably chlorine or bromine, especially bromine.

As the leaving group U there come into consideration, for example, —Cl, —Br, —F, —$OSO_3H$, —$SSO_3H$, —OCO—$CH_3$, —$OPO_3H_2$, —OCO—$C_6H_5$, —$OSO_2$—$C_1$-$C_4$alkyl and —$OSO_2$—$N(C_1$-$C_4$alkyl$)_2$. Preferably, U is a group of formula —Cl, —$OSO_3H$, —$SSO_3H$, —OCO—$CH_3$, —OCO—$C_6H_5$ or —$OPO_3H_2$, especially —Cl or —$OSO_3H$.

Examples of suitable radicals Z are accordingly vinyl, β-bromo- or β-chloro-ethyl, β-acetoxyethyl, β-benzoyloxyethyl, β-phosphatoethyl, β-sulfatoethyl and β-thiosulfatoethyl. Z is preferably vinyl, β-chloroethyl or β-sulfatoethyl and especially β-sulfatoethyl or vinyl.

T is preferably a non-fibre-reactive substituent, one of the above-mentioned fibre-reactive radicals of formula (2a), (2b), (2c), (2d), (2e) or (2f), or a radical of the above formula (3), the definitions and preferred meanings given above applying to the mentioned radicals.

When T is a fibre-reactive radical, it is preferably a radical of formula (2c), (2d), (2e) or (2f), especially of formula (2c) or (2d) and more especially of formula (2c).

Preferably, k is the number 0.

Preferably, p is the number 1 or 2, especially 1.

Preferably, q is the number 0.

The radical of formula (2c) is preferably a radical of formula

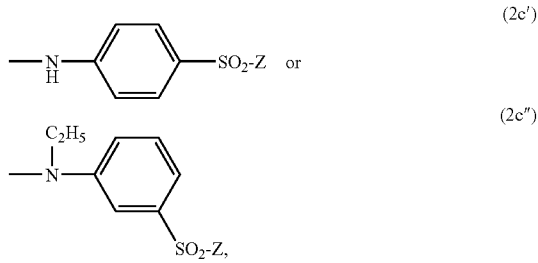

wherein Z has the definition and preferred meanings given above.

Preference is given to reactive dyes of formula

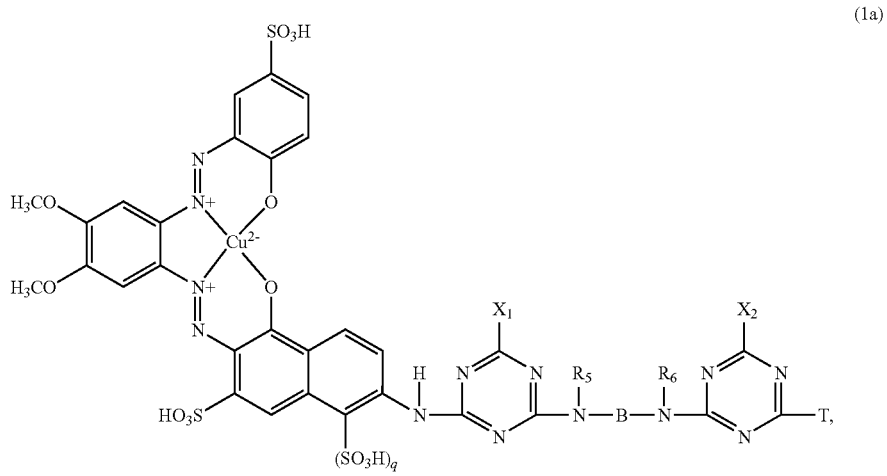

(1a)

wherein

B, $X_1$, $X_2$, $R_5$, $R_6$, T and q each have the definitions and preferred meanings given above, T, when it denotes a radical of formula (3), corresponding to a radical of formula

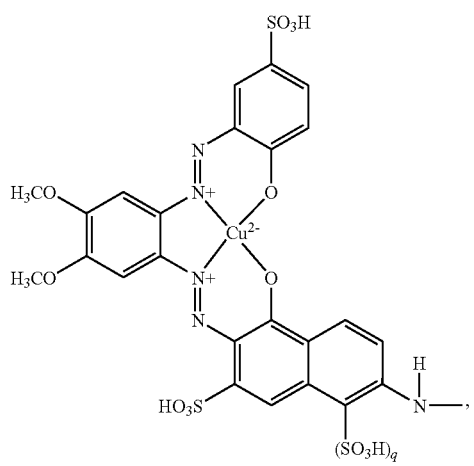

(3a)

and, especially, B is a $C_2$-$C_6$alkylene radical, $R_5$ and $R_6$ are hydrogen, $X_1$ is fluorine or chlorine, $X_2$ is fluorine, q is the number 0 or 1, and T is amino, N-methylamino, N-ethylamino, N-β-hydroxyethylamino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino, 2,5-disulfophenylamino, 4,8-disulfo-2-naphthylamino, a fibre-reactive radical of the above-mentioned formula (2c) or a radical of the above-mentioned formula (3a).

The reactive dyes of formula (1) can be obtained, for example, by reacting with one another, in any order, an amino compound of formula

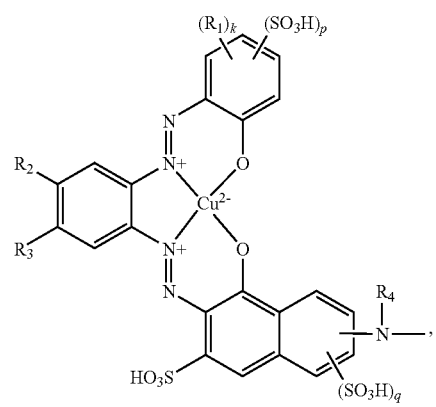

(5)

a diamine of formula $R_6$—HN—B—NH—$R_6$      (6), a compound of formula

T-H      (7), a compound of formula

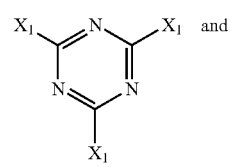

and      (8a)

a compound of formula

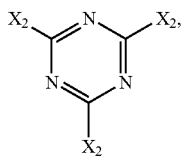

(8b)

wherein B, $R_1$, $R_2$, $R_3$, $R_4$, $R_5$, $R_6$, $X_1$, $X_2$, T, k, p and q each have the definitions and preferred meanings given above.

One process variant comprises first condensing one of the compounds of formulae (5) and (7) with a compound of formula (8a) or (8b), condensing the condensation product with a diamine of formula (6) and reacting the resulting reaction product with the other compound of formula (5) or (7) which has been condensed beforehand with the compound of formula (8a) or (8b). A further process variant comprises first condensing the compound of formula (5) with a compound of formula (8a) or (8b), condensing the condensation product with a diamine of formula (6) and reacting the resulting reaction product with the compound of formula (5) again, which compound of formula (5) has been condensed beforehand with the compound of formula (8a) or (8b).

In the preparation of a reactive dye of formula (1) wherein T is a radical of formula (3), the compound of formula (7) corresponds to a further amino compound of formula (5), the meaning of the radical $R_1$, $R_2$, $R_3$, $R_4$, k, p or q in the amino compound of formula (5) and the meaning of the corresponding radical $R_1$, $R_2$, $R_3$, $R_4$, k, p or q in the further amino compound of formula (5) being either identical to or different from one another.

In the preparation of a reactive dye of formula (1), preference is given to using equimolar amounts of each of the compounds of formulae (5), (6), (7), (8a) and (8b).

The condensation reactions between the compounds of formulae (5), (6), (7), (8a) and (8b) are generally carried out analogously to known methods, usually in aqueous solution at temperatures of, for example, from 0 to 50° C. and a pH value of, for example, from 4 to 10. The compounds of formulae (5), (6), (7) and the cyanuric halides of formulae (8a) and (8b) are known or can be prepared in analogy to known compounds.

The preparation of the compounds of formula (5) is disclosed, for example, in U.S. Pat. No. 4,772,687.

The end product can optionally, in addition, be subjected to a conversion reaction. Such a conversion reaction is, for example, the conversion of a vinylatable reactive group T (Z or Q) into its vinyl form by treatment with dilute sodium hydroxide solution, such as, for example, the conversion of a β-sulfatoethylsulfonyl or β-chloroethylsulfonyl group into a vinylsulfonyl radical or the conversion of an α,β-dihalopropionylamino group into an α-haloacryloylamino radical. Such reactions are known per se. The conversion reaction is generally carried out in a neutral to alkaline medium at a temperature of, for example, from 20 to 70° C., at a pH value of, for example, from 6 to 14.

Suitable cyanuric halides of formulae (8a) and (8b) are, for example, cyanuric chloride or cyanuric fluoride. A suitable cyanuric halide of formula (8b) is, especially, cyanuric fluoride.

The reactive dyes of formula (1) according to the invention are either in the form of the free acid or, preferably, in the form of a salt thereof. Salts that come into consideration are, for example, alkali metal, alkaline earth metal and ammonium salts, and salts of organic amines. Sodium, lithium, potassium and ammonium salts and salts of mono-, di- and tri-ethanolamine may be mentioned as examples.

The compounds of formula (1) according to the invention are suitable as dyes for dyeing and printing an extremely wide variety of materials, such as hydroxyl-group-containing or nitrogen-containing fibre materials. Examples of nitrogen-containing fibre materials that may be mentioned are silk, leather, wool, polyamide fibres and polyurethanes. The reactive dyes according to the invention are suitable especially for dyeing and printing cellulose-containing fibre materials of all kinds. Such cellulose-containing fibre materials are, for example, the natural cellulosic fibres, such as cotton, linen and hemp, and also cellulose and regenerated cellulose, preferably cotton. The reactive dyes according to the invention are also suitable for dyeing or printing cellulosic blend fabrics, e.g. mixtures of cotton with polyamide fibres or especially cotton/polyester blend fibres.

The reactive dyes according to the invention can be applied to the fibre material and fixed to the fibre in a variety of ways, especially in the form of aqueous dye solutions and dye print pastes. They are suitable both for the exhaust method and for dyeing in accordance with the pad-dyeing method, according to which the goods are impregnated with aqueous, optionally salt-containing, dye solutions and, after treatment with alkali or in the presence of alkali, the dyes are fixed, where appropriate with the action of heat or by storing for several hours at room temperature. After fixing, the dyeings or prints are rinsed thoroughly with cold and hot water, optionally with the addition of an agent that has a dispersing action and promotes the diffusion of unfixed dye.

The reactive dyes according to the invention are distinguished by high reactivity, good fixing properties and a very good build-up behavior. They can accordingly be used in accordance with the exhaust method at low dyeing temperatures, and require only short steaming times in the pad-steam process. The degrees of fixing are high and unfixed dye can be washed off easily, the difference between the degree of exhaust and the degree of fixing being remarkably small, that is to say the soaping loss is very low. The dyes according to the invention are also suitable especially for printing, more especially on cotton, but are equally suitable also for printing nitrogen-containing fibres, for example wool or silk or blend fabrics that include wool or silk.

The dyeings and prints produced using the reactive dyes according to the invention have a high tinctorial strength and a high fibre-dye binding stability in both the acidic and the alkaline range, and furthermore have good fastness to light and very good wet-fastness properties, such as fastness to washing, to water, to sea water, to cross-dyeing and to perspiration, as well as good fastness to chlorine, to pleating, to hot-pressing and to rubbing.

The reactive dyes according to the invention are also suitable as colorants for use in recording systems. Such recording systems are, for example, commercially available inkjet printers for paper or textile printing, or writing instruments, such as fountain pens or ballpoint pens and especially inkjet printers. For that purpose, the reactive dye according to the invention is first brought into a form suitable for use in recording systems. A suitable form is, for example, an aqueous ink that comprises the reactive dyes according to the invention as colorant. The inks can be prepared in customary manner by mixing together the individual components customary in inkjet printing in the desired amount of water.

Substrates that come into consideration for the inkjet printing include, besides paper or plastics films, for example the above-mentioned hydroxyl-group-containing or nitrogen-containing fibre materials, especially cellulose-containing fibre materials. The fibre materials are preferably textile fibre materials.

The following Examples serve to illustrate the invention. Unless otherwise indicated, the temperatures are given in degrees Celsius, parts are parts by weight and percentages relate to percent by weight. Parts by weight relate to parts by volume in a ratio of kilograms to liters.

EXAMPLE 1

(a) 101 parts of aniline-2,5-disulfonic acid are suspended in 350 parts of water and dissolved by adding an aqueous sodium hydroxide solution (30%) until neutral. 750 parts of ice and 2 parts of sodium hydrogen carbonate are added to that solution, and cooling to −2° C. is carried out. At that temperature, 63.2 parts of cyanuric fluoride are slowly added, the pH being maintained at 6 using aqueous sodium hydroxide solution. The reaction is completed by stirring the reaction mixture at from 0 to 2° C.

(b) 92.6 parts of 40% 1,2-propylenediamine solution are adjusted to pH 7 to 7.5 using hydrochloric acid (32%). The solution is added at 10° C., with stirring, to the reaction mixture obtained according to (a), the pH being maintained at 6 using aqueous sodium hydroxide solution. When the addition is complete, the reaction mixture is adjusted to pH 7. The reaction mixture is then buffered by means of sodium tripolyphoshate, and the reaction product is precipitated by the addition, in portions, of sodium chloride. The precipitate is isolated by filtration and the residue is washed. A condensation product is obtained which, in the form of the free acid, corresponds to formula

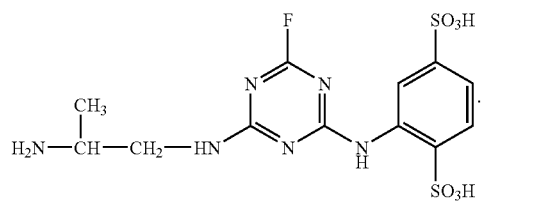

(100)

(c) 4870 parts of an aqueous solution containing 166.3 parts of a compound of formula

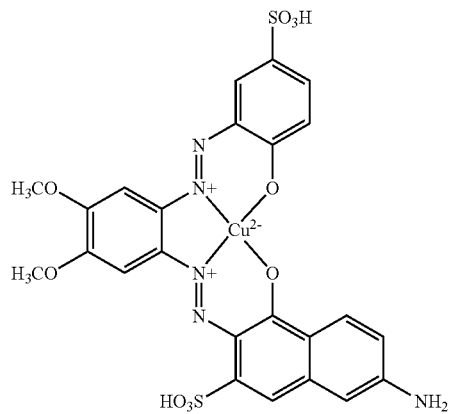

are cooled to 0° C., and 400 parts of ice are added. At that temperature, 38.5 parts of cyanuric fluoride are slowly added, the pH being maintained at 6.5 using aqueous sodium hydroxide solution. The reaction is completed by stirring the reaction mixture at 0° C.

(d) 225 parts of the condensation product obtained according to (b) (containing approximately 51% of the compound of formula (100)) are ground in 3700 parts of water using a high-speed stirrer. The resulting mixture is added to the reaction mixture obtained according to (c), which has been adjusted to pH 4 using hydrochloric acid (32%). The reaction mixture is then adjusted to pH 9.5 using aqueous sodium hydroxide solution (30%) and the reaction is completed by stirring at from 5 to 10° C. The reaction mixture is then adjusted to pH 7 using hydrochloric acid, filtered until clear, freed of salt by dialysis and concentrated. A compound is obtained which, in the form of the free acid, corresponds to formula

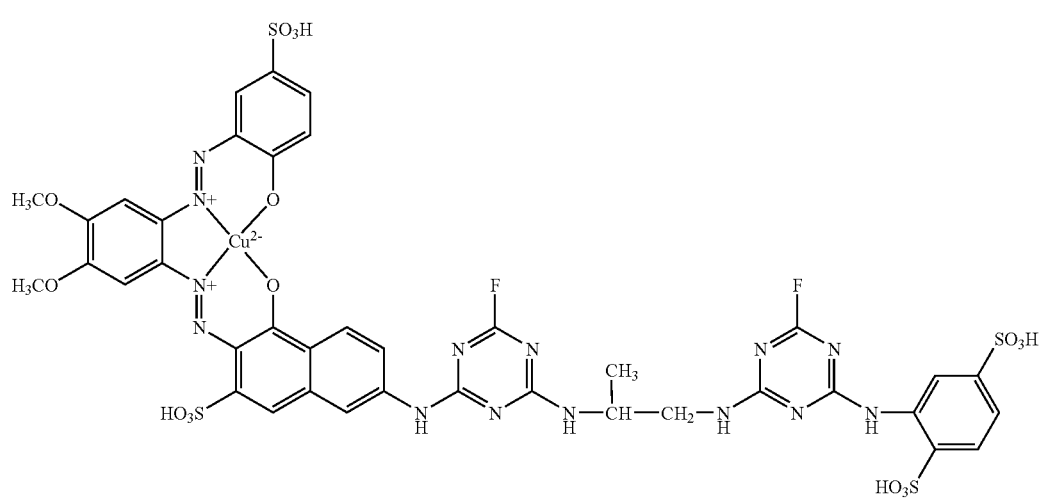

(101)

($\lambda_{max}$: 462 nm) and dyes cotton in an olive-green shade having good all-round fastness properties.
EXAMPLES 2 TO 10
The dyes indicated below, which dye cotton in olive-green shades having good all-round fastness properties, can be obtained in an analogous manner to that described in Example 1.
(102)
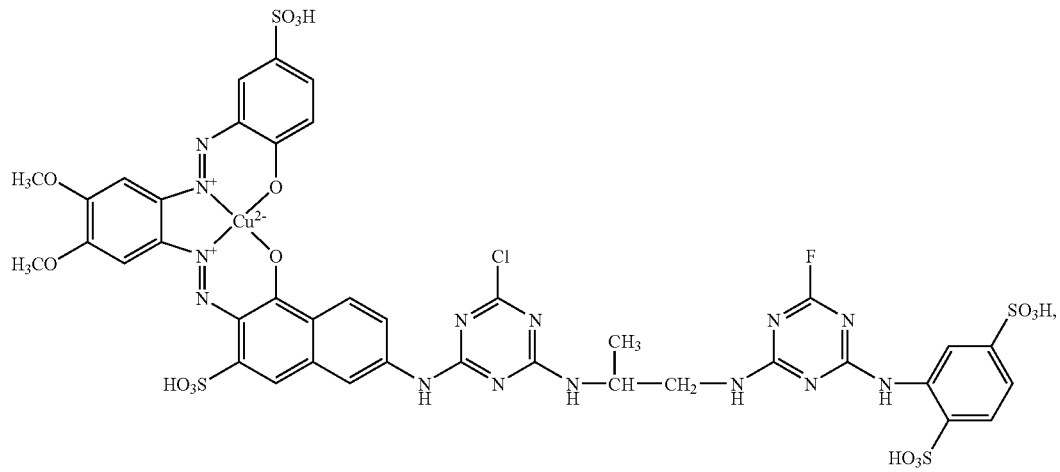
($\lambda_{max}$: 463 nm)
(103)
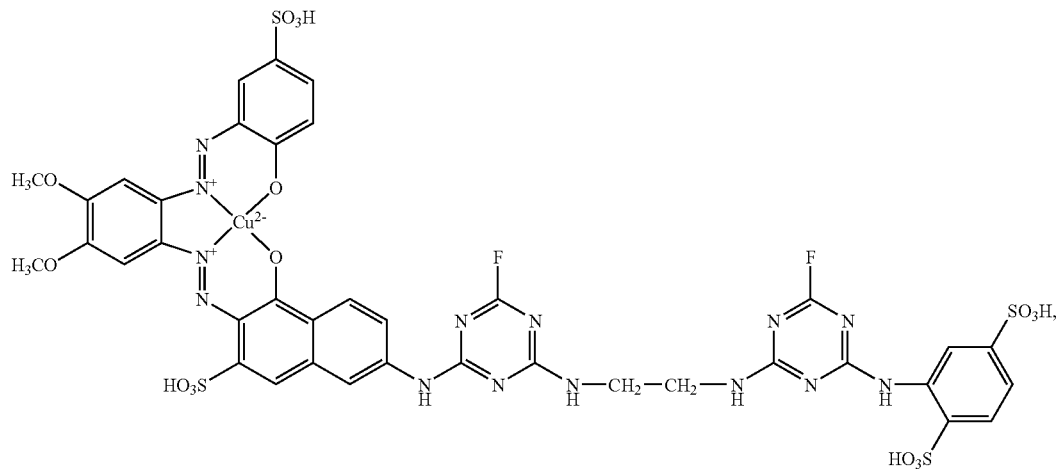
($\lambda_{max}$: 462 nm)

(104)
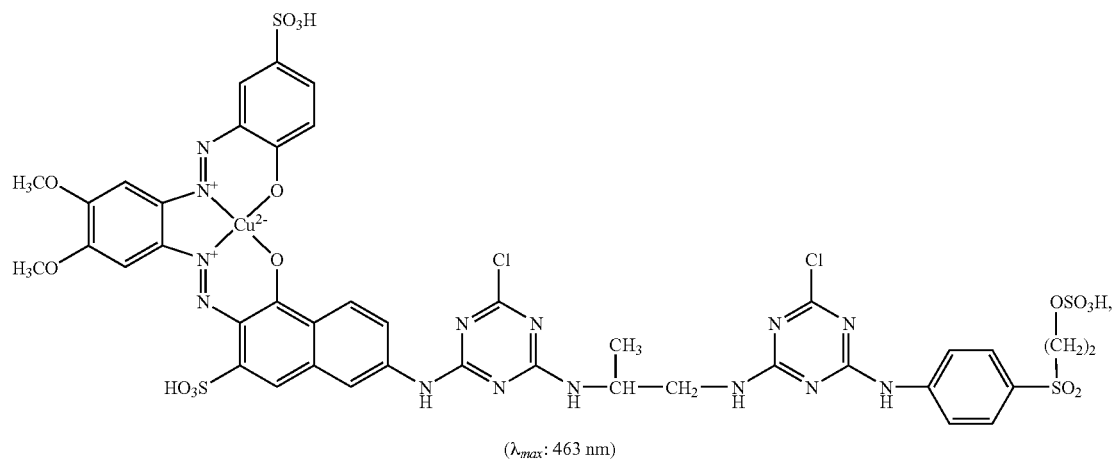
($\lambda_{max}$: 463 nm)
(105)
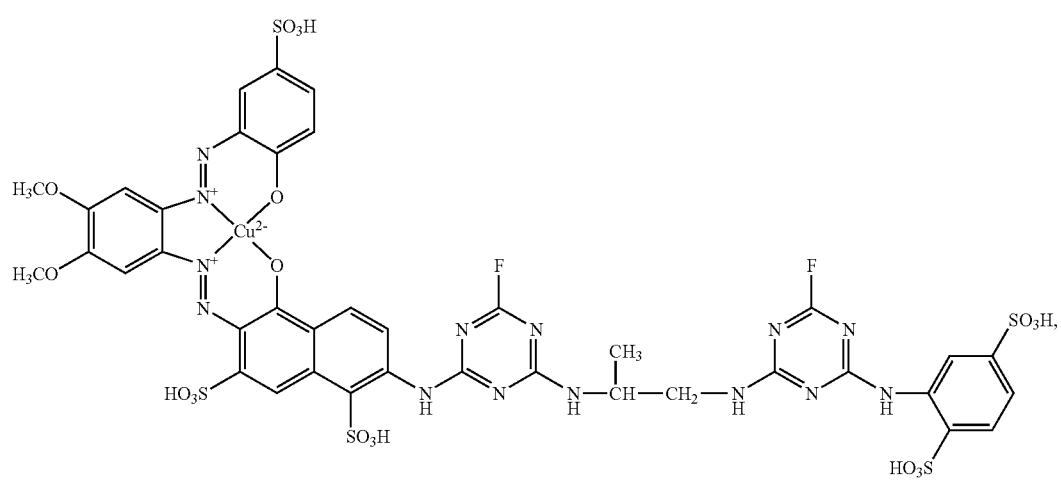
($\lambda_{max}$: 460 nm)
(106)
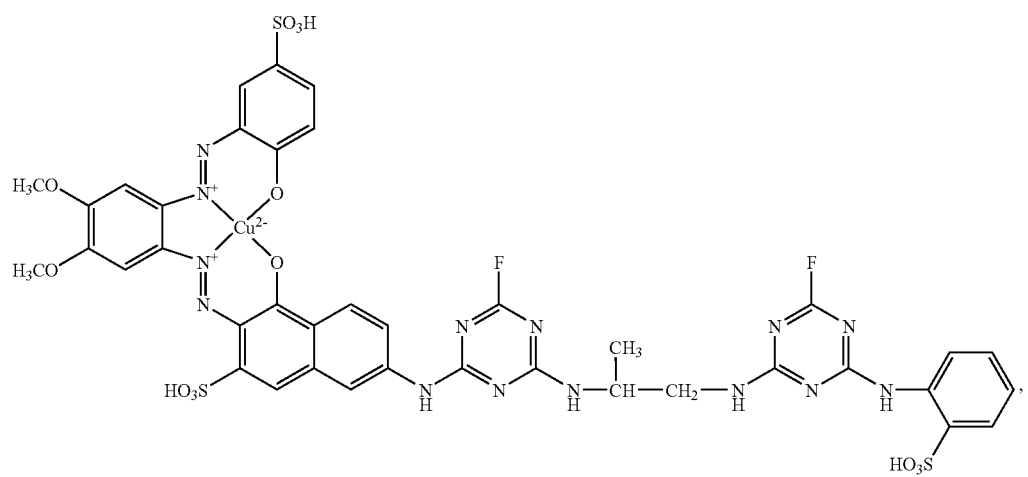
($\lambda_{max}$: 464 nm)

-continued
(107)
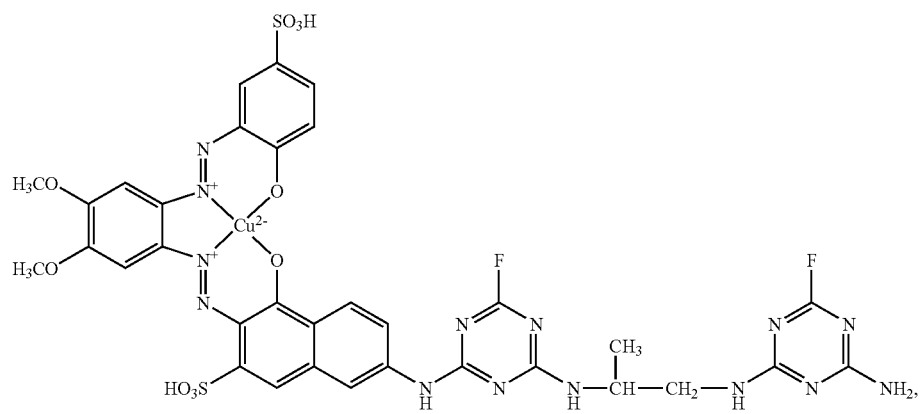
(λ$_{max}$: 463 nm)
(108)
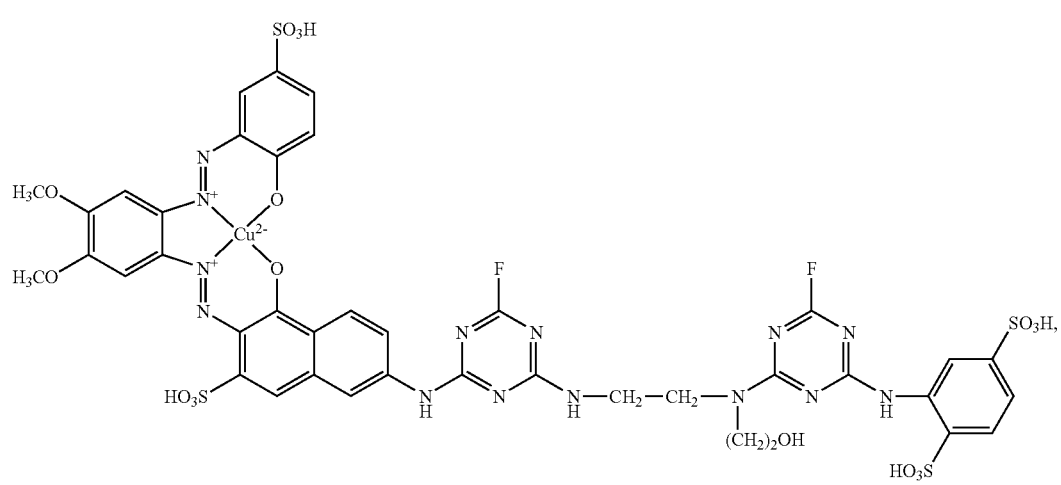
(λ$_{max}$: 463 nm)
(109)
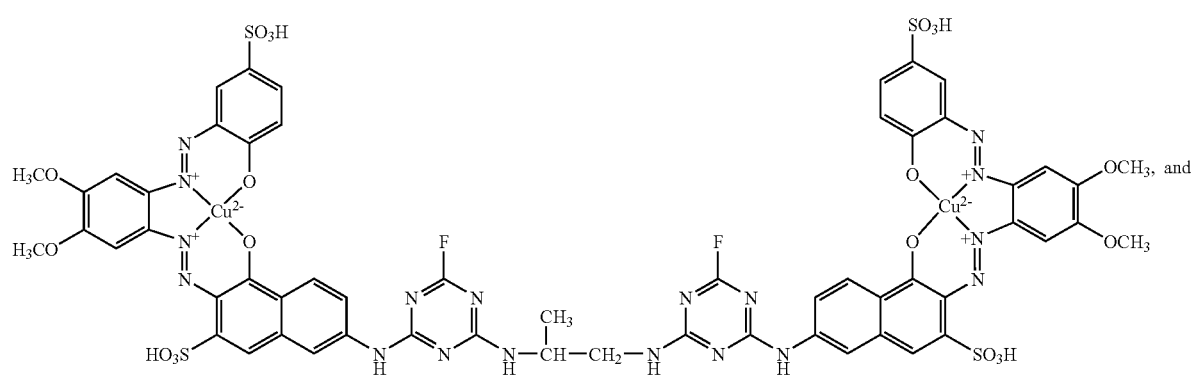
(λ$_{max}$: 467 nm)

-continued (110)

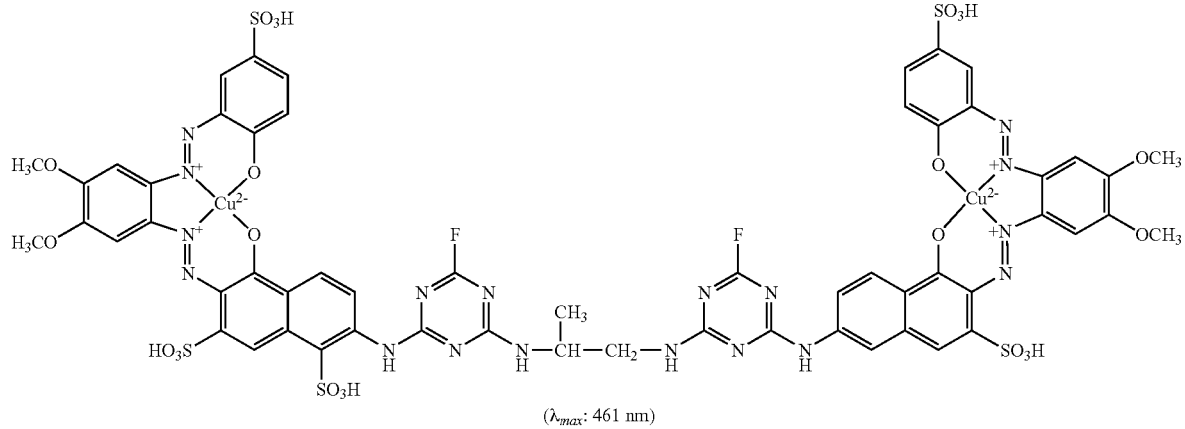

($\lambda_{max}$: 461 nm)

Dyeing Procedure I 100 parts of cotton fabric are introduced at 60° C. into 1500 parts of a dye bath containing 45 g/l of sodium chloride and 2 parts of the reactive dye obtained according to Example 1. After 45 minutes at 60° C., 20 g/l of anhydrous sodium carbonate are added. Dyeing is continued for a further 45 minutes at that temperature. The dyed goods are then rinsed, soaped at the boil for a quarter of an hour with a non-ionic detergent, rinsed again and dried.

As an alternative to the above procedure, the dyeing can be carried out at 80° C. instead of at 60° C.

Dyeing Procedure II 0.1 part of the dye according to Example 1 is dissolved in 200 parts of water, and 0.5 part of sodium sulfate, 0.1 part of a levelling adjuvant (based on the condensation product of a higher aliphatic amine and ethylene oxide) and also 0.5 part of sodium acetate are added.

The pH is then adjusted to a value of 5.5 using acetic acid (80%). The dye bath is heated at 50° C. for 10 minutes and then 10 parts of a woollen fabric are added. Heating is then carried out, over the course of approximately 50 minutes, to a temperature of 100° C. and dyeing is carried out at that temperature for 60 minutes, after which the dye bath is allowed to cool to 90° C. and the dyed goods are removed. The woollen fabric is washed with hot and cold water, and is then spun and dried.

Printing Procedure 3 parts of the dye obtained according to Example 1 are sprinkled, with rapid stirring, into 100 parts of a stock thickener containing 50 parts of 5% sodium alginate thickener, 27.8 parts of water, 20 parts of urea, 1 part of sodium m-nitrobenzenesulfonate and 1.2 parts of sodium hydrogen carbonate. The print paste so obtained is used to print a cotton fabric, and the resulting printed material is dried and steamed in saturated steam for 2 minutes at 102° C. The printed fabric is then rinsed, if desired soaped at the boil and rinsed again, and subsequently dried.

What is claimed is:

1. A reactive dye of formula

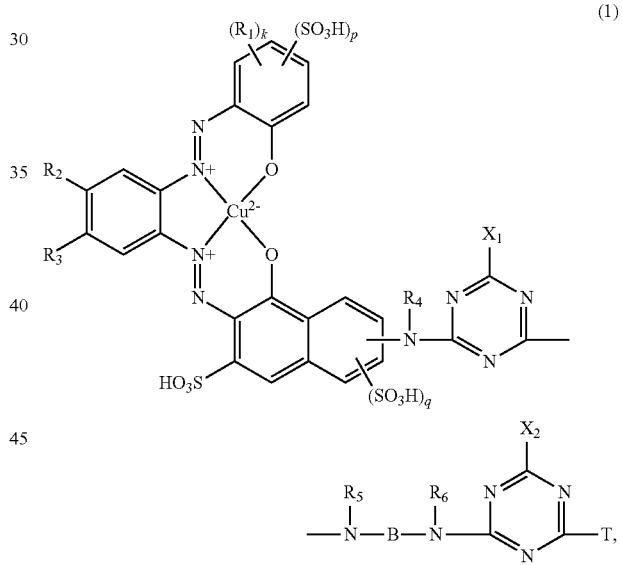

wherein

B is an aliphatic bridging member, $R_1$ is $C_1$-$C_4$ alkyl, halogen or an —$SO_2$—Z radical, $R_2$ and $R_3$ are each independently of the other $C_1$-$C_4$ alkoxy, $R_4$, $R_5$ and $R_6$ are each independently of the others hydrogen or unsubstituted or substituted $C_1$-$C_4$ alkyl, k and q are each independently of the other the number 0 or 1, p is the number 0, 1 or 2, $X_1$ and $X_2$ are each independently of the other halogen, and T is halogen, a non-fibre-reactive substituent or a fibre-reactive radical of formula

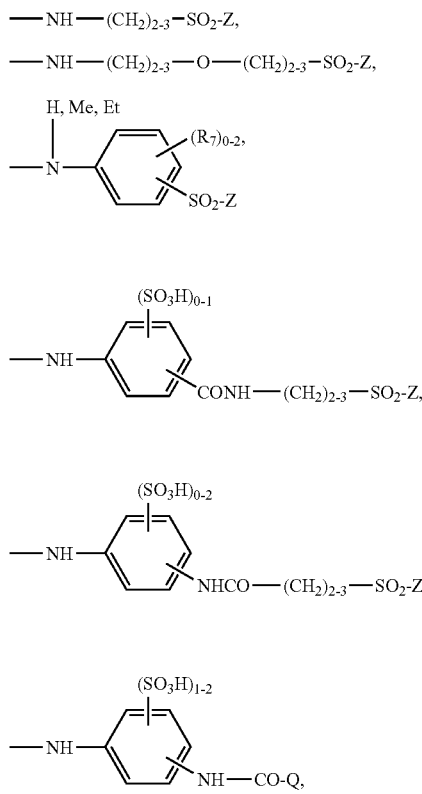

(2a) —NH—(CH$_2$)$_{2-3}$—SO$_2$-Z, (2b) —NH—(CH$_2$)$_{2-3}$—O—(CH$_2$)$_{2-3}$—SO$_2$-Z, (2c) [structure with H, Me, Et; N-aryl with (R$_7$)$_{0-2}$ and SO$_2$-Z]

(2d) [—NH-aryl with (SO$_3$H)$_{0-1}$ and CONH—(CH$_2$)$_{2-3}$—SO$_2$-Z]

(2e) [—NH-aryl with (SO$_3$H)$_{0-2}$ and NHCO—(CH$_2$)$_{2-3}$—SO$_2$-Z or]

(2f) [—NH-aryl with (SO$_3$H)$_{1-2}$ and NH—CO-Q,]

wherein
(R$_7$)$_{0-2}$ denotes from 0 to 2 identical or different substituents from the group halogen, C$_1$-C$_4$ alkyl, C$_1$-C$_4$ alkoxy and sulfo,
Z is vinyl or a —CH$_2$—CH$_2$—U radical and U is a group that is removable under alkaline conditions,
Q is a —CH(Hal)-CH$_2$-Hal or —C(Hal)=CH$_2$ group and Hal is halogen, or
T is a radical of formula

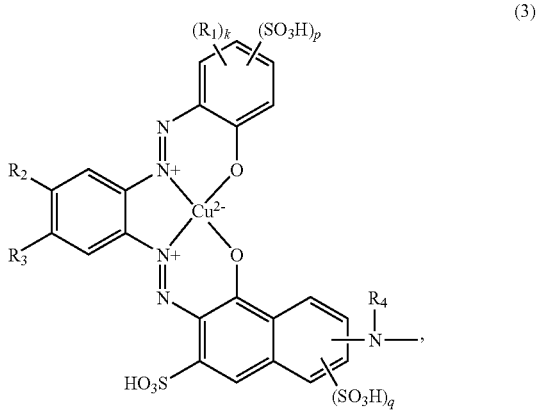

wherein
R$_1$, R$_2$, R$_3$, R$_4$, k, p and q are each as defined above.

2. A reactive dye according to claim 1, wherein R$_2$ and R$_3$ are methoxy.

3. A reactive dye according to claim 1, wherein R$_4$ is hydrogen or C$_1$-C$_4$ alkyl.

4. A reactive dye according to claim 1, wherein R$_5$ and R$_6$ are each independently of the other hydrogen or C$_1$-C$_4$ alkyl.

5. A reactive dye according to claim 1, wherein B is a C$_2$-C$_{12}$ alkylene radical that may be interrupted by 1, 2 or 3 —O— members and that is unsubstituted or substituted by hydroxy, sulfo, sulfato, cyano or by carboxy.

6. A reactive dye according to claim 1, wherein X$_1$ and X$_2$ are each independently of the other fluorine or chlorine.

7. A reactive dye according to claim 1 that corresponds to formula

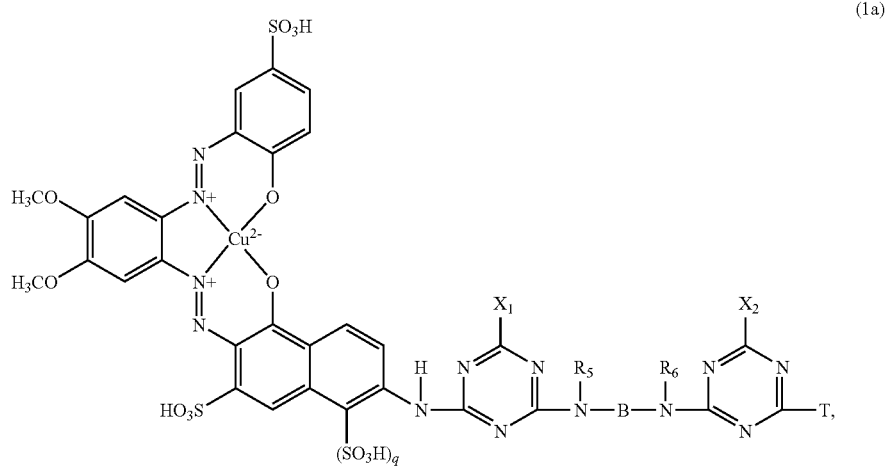

(1a)

23 wherein

B, $X_1$, $X_2$, $R_5$, $R_6$, T and q are each as defined according to claim 1, T, when it denotes a radical of formula (3), corresponding to a radical of formula

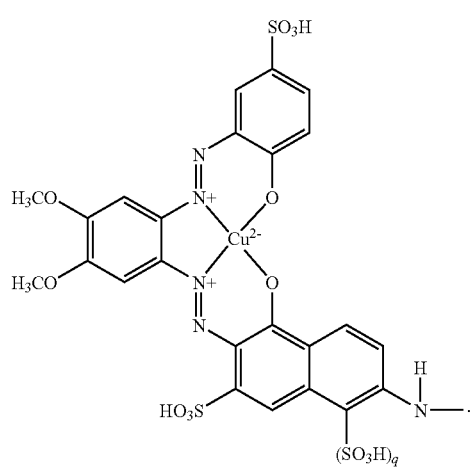

(3a)

8. A reactive dye according to claim 7, wherein B is a $C_2$-$C_6$ alkylene radical, $R_5$ and $R_6$ are hydrogen, $X_1$ is fluorine or chlorine, $X_2$ is fluorine, q is the number 0 or 1, and T is amino, N-methylamino, N-ethylamino, N-β-hydroxyethyl-amino, N-methyl-N-β-hydroxyethylamino, N-ethyl-N-β-hydroxyethylamino, N,N-di-β-hydroxyethylamino, β-sulfoethylamino, morpholino, 2-, 3- or 4-carboxyphenylamino, 2-, 3- or 4-sulfophenylamino, 2,5-disulfophenylamino, 4,8-disulfo-2-naphthylamino, a fibre-reactive radical of formula (2c) or a radical of formula (3a).

9. A process for the preparation of a reactive dye of formula (1) according to claim 1, which comprises reacting with one another, in any order,

24 a) an amino compound of formula

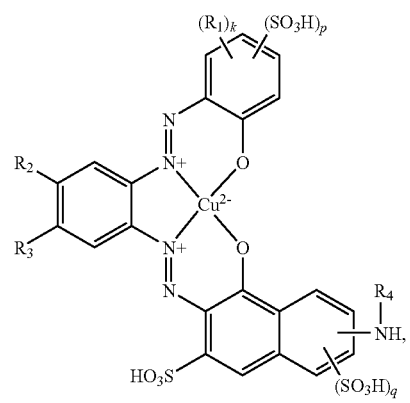

(5)

b) a diamine of formula $R_5$—HN—B—NH—$R_6$ (6), c) a compound of formula

T-H (7), d) a compound of formula

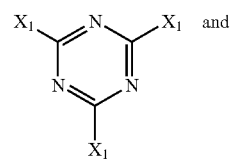

(8a)

and e) a compound of formula

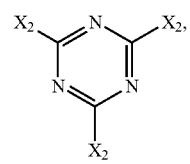

(8b)

wherein B, $R_1$, $R_2$, $R_3$, $R_4$, $R_5$, $R_6$, $X_1$, $X_2$, T, k, p and q are each as defined according to claim 1.

10. A method of dyeing or printing a fibre material comprising
a) applying to the fibre material a reactive dye of formula

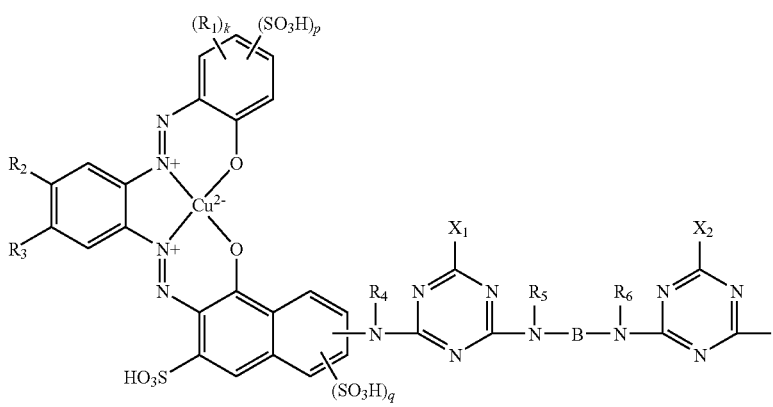

(1)

wherein
B is an aliphatic bridging member,
$R_1$ is $C_1$-$C_4$ alkyl, halogen or an —$SO_2$—Z radical,
$R_2$ and $R_3$ are each independently of the other $C_1$-$C_4$ alkoxy,
$R_4$, $R_5$ and $R_6$ are each independently of the others hydrogen or unsubstituted or substituted $C_1$-$C_4$ alkyl,
k and q are each independently of the other the number 0 or 1,
p is the number 0, 1 or 2,
$X_1$ and $X_2$ are each independently of the other halogen, and
T is halogen, a non-fibre-reactive substituent or a fibre-reactive radical of formula —NH—$(CH_2)_{2-3}$—$SO_2$-Z,  (2a)

—NH—$(CH_2)_{2-3}$—O—$(CH_2)_{2-3}$—$SO_2$-Z,  (2b)

(2c)

$$-\underset{\text{H, Me, Et}}{N}-\underset{SO_2\text{-}Z}{\overset{(R_7)_{0-2}}{\bigcirc}}$$

(2d)

$$-NH-\underset{CONH-(CH_2)_{2-3}-SO_2\text{-}Z}{\overset{(SO_3H)_{0-1}}{\bigcirc}},$$

(2e)

$$-NH-\underset{NHCO-(CH_2)_{2-3}-SO_2\text{-}Z}{\overset{(SO_3H)_{0-2}}{\bigcirc}} \text{ or}$$

(2f)

$$-NH-\underset{NH-CO\text{-}Q}{\overset{(SO_3H)_{1-2}}{\bigcirc}},$$

wherein
$(R_7)_{0-2}$ denotes from 0 to 2 identical or different substituents from the group halogen,
$C_1$-$C_4$ alkyl, $C_1$-$C_4$ alkoxy and sulfo,
Z is vinyl or a —$CH_2$—$CH_2$—U radical and U is a group that is removable under alkaline conditions,
Q is a —CH(Hal)-$CH_2$-Hal or —C(Hal)=$CH_2$ group and Hal is halogen, or
T is a radical of formula

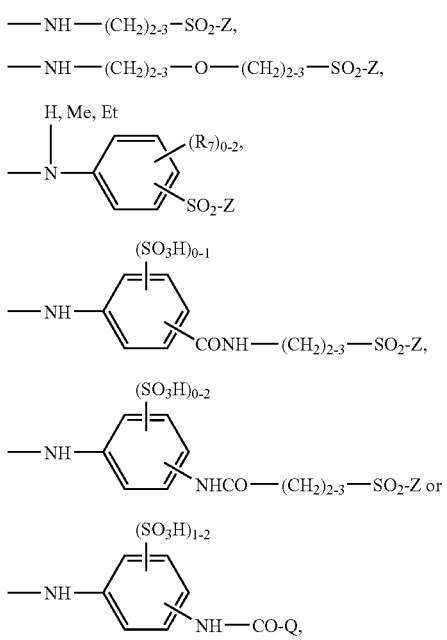

(3)

wherein
$R_1$, $R_2$, $R_3$, $R_4$, k, p and q are each as defined above;
b) fixing the dye of formula (1) to the fibre material; and
c) rinsing the dyed or printed fibre material.

11. The method according to claim 10, wherein the fibre material is a hydroxyl-group containing fibre material or a nitrogen-containing fibre material.

12. The method according to claim 10, wherein the fibre material is a cellulose-containing fibre material.

13. The method according to claim 12, wherein the cellulose-containing fibre material is cotton.

14. The method according to claim 10, wherein the reactive dye of formula (1) is applied to the fibre material in the form of an aqueous solution or print paste.

* * * * *